United States Patent [19]

Clocksin et al.

[11] Patent Number: 4,923,495
[45] Date of Patent: May 8, 1990

[54] PULL-ROLL ASSEMBLY LATCHING MECHANISM

[75] Inventors: Kenneth A. Clocksin; Edward L. Hite, both of Toledo, Ohio

[73] Assignee: Manville Corporation, Denver, Colo.

[21] Appl. No.: 358,994

[22] Filed: May 26, 1989

[51] Int. Cl.⁵ ............................................ C03B 37/065
[52] U.S. Cl. ........................................ 65/11.1; 65/16; 19/267; 29/128; 226/176; 226/180
[58] Field of Search ........................................ 65/5–16, 65/10.1, 11.1, 10.2; 19/128, 267; 29/128.4 A, 130; 72/172, 182; 226/176, 180

[56] References Cited

U.S. PATENT DOCUMENTS

| | | | |
|---|---|---|---|
| 3,508,461 | 4/1970 | Stream | 65/10.2 |
| 3,731,575 | 5/1973 | Gelin | 65/10.2 X |
| 4,288,000 | 6/1980 | Drummond | 65/10.2 X |
| 4,414,010 | 11/1983 | Chin et al. | 65/16 |

*Primary Examiner*—Robert L. Lindsay
*Attorney, Agent, or Firm*—John D. Lister; Cornelius P. Quinn; Fred A. Winans

[57] ABSTRACT

A latch mechanism adapted to lock a movable pull roll support to a fixed pull roll support in a mineral fiber attenuation apparatus. A latch arm is pivotally attached intermediate its length to the movable support and is spring biased into locking engagement with a latch seat on the fixed roll support. The latching surface of the latch arm and the mating surface of the latch seat are substantially perpendicular to a plane extending through the end of the latch seat and the pivotal attachment. This causes the latch to release upon relatively low pressure being applied to the opposite end of the latch arm.

9 Claims, 3 Drawing Sheets 4,923,495

PULL-ROLL ASSEMBLY LATCHING MECHANISM

FIELD OF THE INVENTION

This invention relates to a latch mechanism. More particularly, it relates to an improved latch mechanism adapted for use in a mineral fiber attenuation apparatus for the purpose of locking a movable pull roll support in place adjacent a fixed pull roll support.

BACKGROUND OF THE INVENTION

One of the processes for manufacturing mineral fibers is the flame attenuation process. This is typically employed to manufacture glass fibers by first forming glass marbles or pellets in a conventional glass furnace, then at a later time remelting the marbles or pellets in a crucible containing a large number of small orifices. Glass issuing from the crucible orifices is initially attenuated by a mechanical pull-roll assembly which pulls the molten glass into the form of small diameter glass rods, known as primary filaments or "primaries". The primaries are then further attenuated by a hot high velocity jet of combustion gases emitted from a burner to form fine glass fibers.

A pull-roll assembly basically comprises a drive roll mounted in a stationary support and an idler or driven roll mounted in a movable support. The idler roll is biased against the drive roll by a spring arrangement to cause the drive roll to rotate the idler roll. The movable support that carries the idler roll is locked in place so that constant pressure is applied to the idler roll. A conventional type of locking mechanism comprises an assembly consisting of two latch arms located at opposite ends of the pull rolls. Each latch arm is pivotally mounted on the movable idler roll support and has a hooked end which engages a latch pin on the stationary support. The latch arm is typically biased into locking position by a leaf spring which engages both the latch arm and the movable idler roll support. Such an arrangement is described in more detail in U.S. Pat. No. 4,414,010, which issued on Nov. 8, 1983 in the name of Chin et al.

Although the fiber forming operation is continuous, the pull-roll assemblies have to be monitored by operators who from time to time are required to clear the pull rolls of foreign objects or replace one or both of the rollers. This requires the operator to press a release bar connecting the latch arms with enough force so as to move the latch arms against the tension of the springs and out of engagement with the latch pins. As shown in FIG. 1 of the aforementioned patent, which illustrates a typical arrangement of this type, this would require the release bar 106 to be pushed against the force of the leaf springs 112 in order to unlatch the latch arm hooks 108 from the latch pins 110. Although the drawing in the patent is on a small scale, it can be seen that the latch hook extends around a considerable portion of the circumference of the pin 110 in order to prevent the hook from becoming disengaged. To release the hook from the pin it is therefore not enough to simply press down on the release bar since this would merely cause the portion of the hook beneath the pin to be lifted up against the pin. To actually remove the hook from the pin it is necessary to also push the release bar toward the drive roller an amount to allow the hook to clear the pin. This is difficult to do, although possible, when the rolls are in face-to-face contact because the rubber covering on the pull rolls can be compressed to an extent. It is very difficult to accomplish, however, when a foreign object is in the nip of the rolls, as the movable support has to be moved still an additional amount corresponding to the thickness of the object.

In actual practice the extent of the contact between the hook and the pin can be substantially greater than as shown in the patent. Thus in actual practice, if the finger or hand of an operator should get caught between the rolls it would be extremely difficult to unlatch the mechanism simply by exerting force on the release bar.

It is therefore an object of the invention to provide a pull roll latching mechanism which allows the latch to be released simply by pressing on the release bar with a medium amount of pressure, even with a thick foreign object in the nip of the rolls. The latching mechanism of such an arrangement must, however, be able to maintain the movable roll support in operative position against the forces of vibration and other stresses of operation which tend to move the latch out of locked condition.

SUMMARY OF THE INVENTION

In accordance with the invention a latch mechanism is provided which comprises a latch arm pivotally attached intermediate its length to one of the pull roll support means and a spring means biasing the latch arm into locking engagement with a latch seat on the other pull roll support means. The latching surface of the latch arm and the mating surface of the latch seat are generally planar surfaces. In addition, the latch arm is provided with handle means on the opposite side of the pivotal attachment from the latching surface to enable an operator to manually press the handle in opposition to the bias of the spring means to cause the latching surface of the latch arm to slidably disengage from the latch seat and release the support means to allow movement of the pull rolls out of engagement with each other. The latch arm and latch seat arrangement is such that pivotal disengagement of the latch arm causes the the latching surface of the latch arm and the mating surface of the latch seat to move relative to each other in a direction having a component separating the surfaces.

The generally planar mating surfaces of the latch arm and the latch seat lie in a plane transverse to a plane extending through the axes of rotation of the pull rolls. Preferably, the two planes are substantially perpendicular to each other. In addition, the extremity of the latching surface is located when in locking condition at a greater radius from the pivotal attachment of the latch arm than is the opposite end of the latching surface. Preferably, the end of the latch seat and the associated end of the latching surface of the latch arm terminate in a plane extending through the pivotal attachment of the latch arm, with the plane being substantially perpendicular to the latching surface and the latch seat.

As a result of this arrangement the latch arm can be pivoted out of engagement with the latch seat simply by pushing the latch arm against the force of the spring bias and against the frictional forces of the latch and latch seat surfaces. Unlike the prior art arrangement described earlier, the design of the latch does not require the movable roll support to be first moved in toward the fixed roll support since it is not necessary to increase the tension exerted on the movable roll in order to release the latch mechanism. The latch mechanism of the invention is not only simple to unlatch, but it also securely holds the roll supports in place during the normal fiber forming operation.

Other features and aspects of the invention, as well as other benefits thereof, will readily be ascertained from the more detailed description of the preferred embodiment which follows.

BRIEF DESCRIPTION OF THE DRAWINGS

FIG. 6 is a diagrammatic representation of the path of movement of the latching surface of the latch arm during its unlatching movement.

DESCRIPTION OF THE PREFERRED EMBODIMENT

Figure 1:
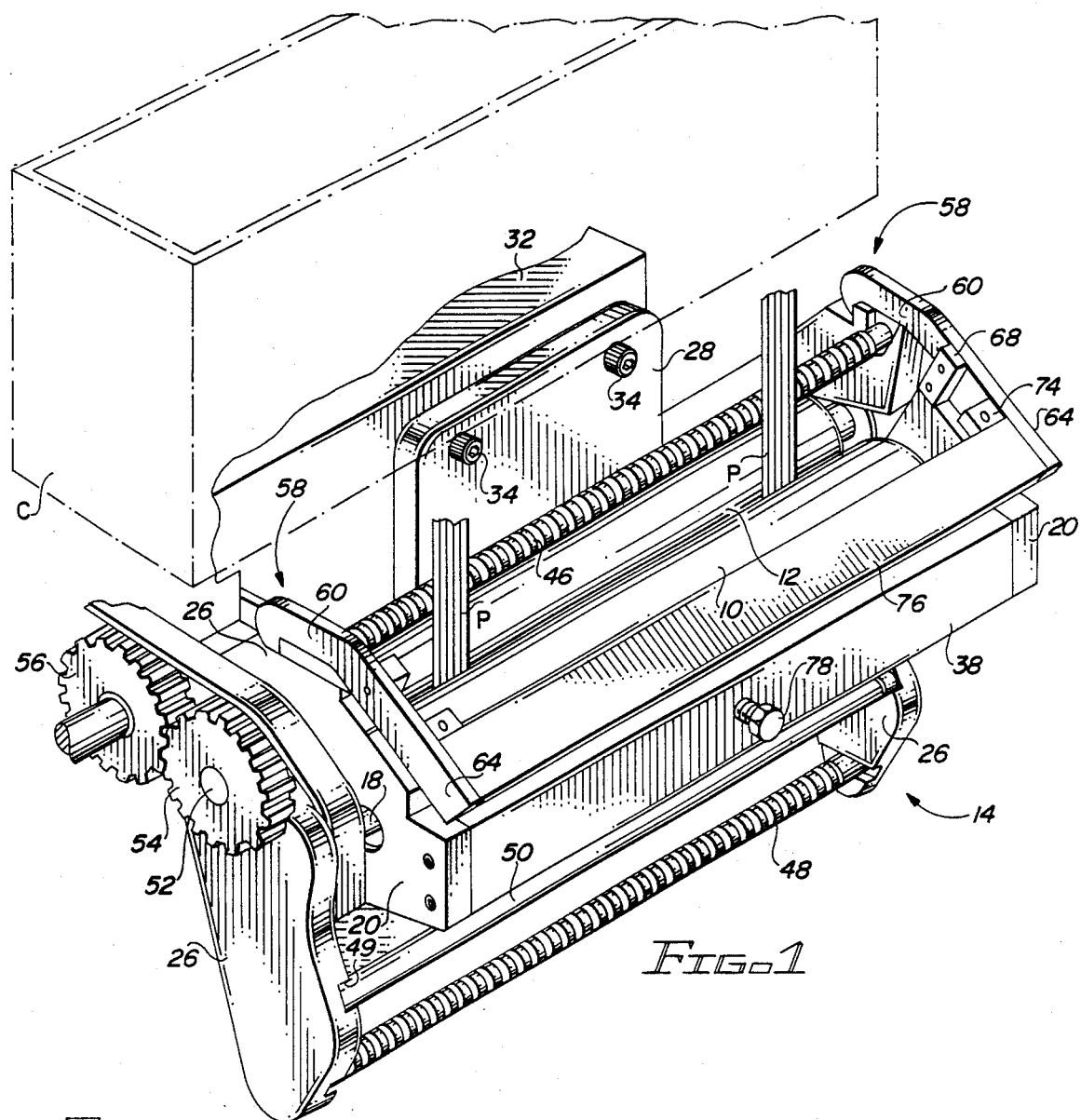
FIG. 1 is a pictorial view of the pull roll mechanism in a fiber attenuation operation, incorporating the latch device of the present invention.
Figure 2:
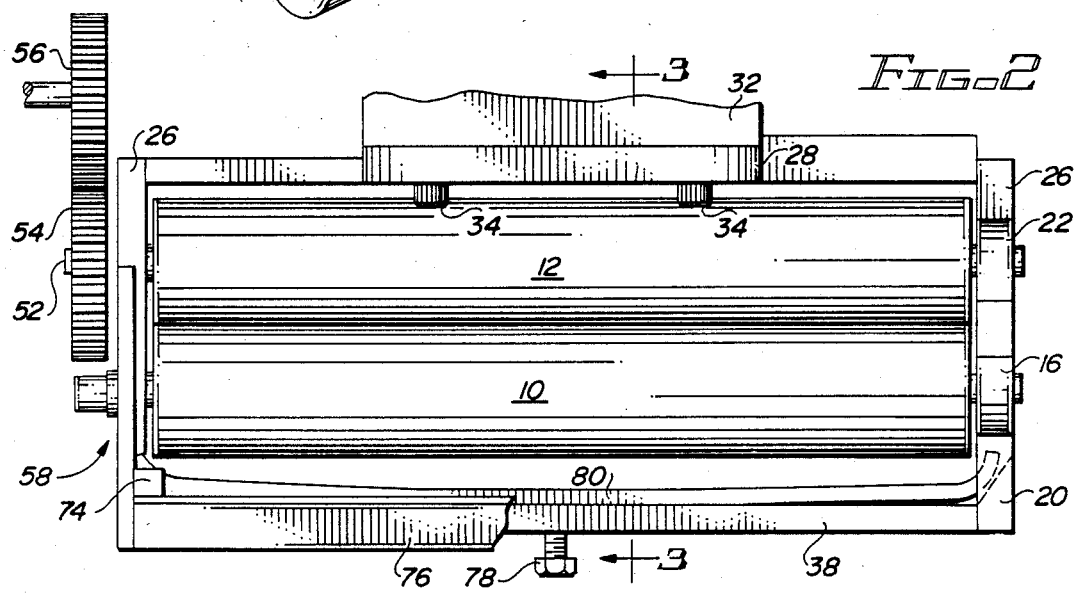
FIG. 2 is a top view of the mechanism of FIG. 1.
Figure 3:
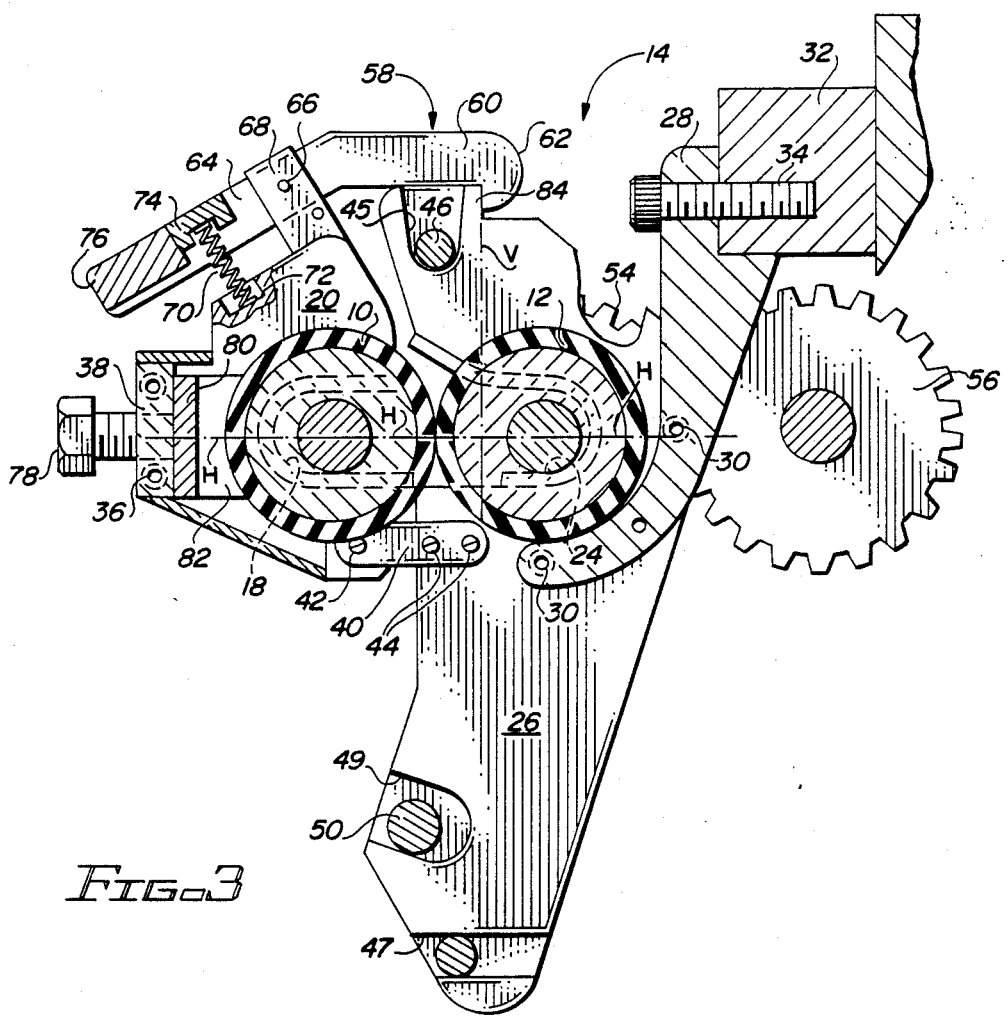
FIG. 3 is a transverse sectional view of the mechanism taken along line 3—3 of FIG. 2.

Referring to FIGS. 1-3, primary filaments P are shown being drawn downwardly from a crucible C by rubber covered coacting counter-rotating pull rolls 10 and 12 of the pull roll assembly 14. The pull roll 10 is mounted in bushings 16 which slidably fit in grooves 18 in the side rear plates 20 of the assembly housing, while the pull roll 12 is mounted in similar bushings 22 which slidably fit in grooves 24 in the front side plates 26 of the housing. As illustrated, the rolls are mounted so that their centers of rotation lie in a common horizontal plane H. The front side plates 26 are connected to front roll housing tie plate 28 by suitable connecting rods or struts attached to the side plates by screws at 30, and the front tie plate 28 is attached to supporting structure 32 through screws 34. The rear side plates 20 are connected by screws 36 to the rear roll housing tie plate 38. The rear side plates 20 are further connected to the front side plates 26 through links 40 which are pivotally connected to the rear side plates at 42 and are connected to the front side plates by pins 44. Mounted in slots 45, 47 and 49 extending through a portion of the thickness of the front side plates 26 are conventional filament guides 46 and 48 and filament pressure bar 50, respectively.

The shaft 52 of the pull roll 12 extends beyond the side plate 26 at one end of the housing and carries a gear 54 which meshes with a driving gear 56. Rotation of the gear 56 thus causes rotation of the gear 54 and the roll 12. The roll 10 is caused to rotate by being held in contact with the rotating roll 12 by latch mechanisms 58 located at opposite ends of the roll 10. Each latch mechanism comprises a latch arm 60 which terminates in a projecting lateral lug portion 62. The latch arm includes an angled lever portion 64 which is pivotally attached at 66 to a bracket 68 extending up from the rear side plate 20. The latch arm is urged downward into locking position by compression spring 70 one end of which is seated in a socket 72 in the rear side plate 20 and the other end of which is seated through a suitable pin arrangement against a support bracket 74 connected to the lever portion 64 of the latch arm. A release bar 76 connects the lever ends of the latch arms to allow an operator to move both latch arms by depressing the release bar. In addition to the pressure exerted on the idler roll 10 by the latch mechanism, final pressure adjustments are made by the adjusting screw 78 which is connected to a tension spring 80 extending across the rear of the housing. As shown in FIGS. 2 and 3, the tension spring includes end fingers 82 which contact the slide bushings 16 in which the roll 10 is mounted.

Figure 4:
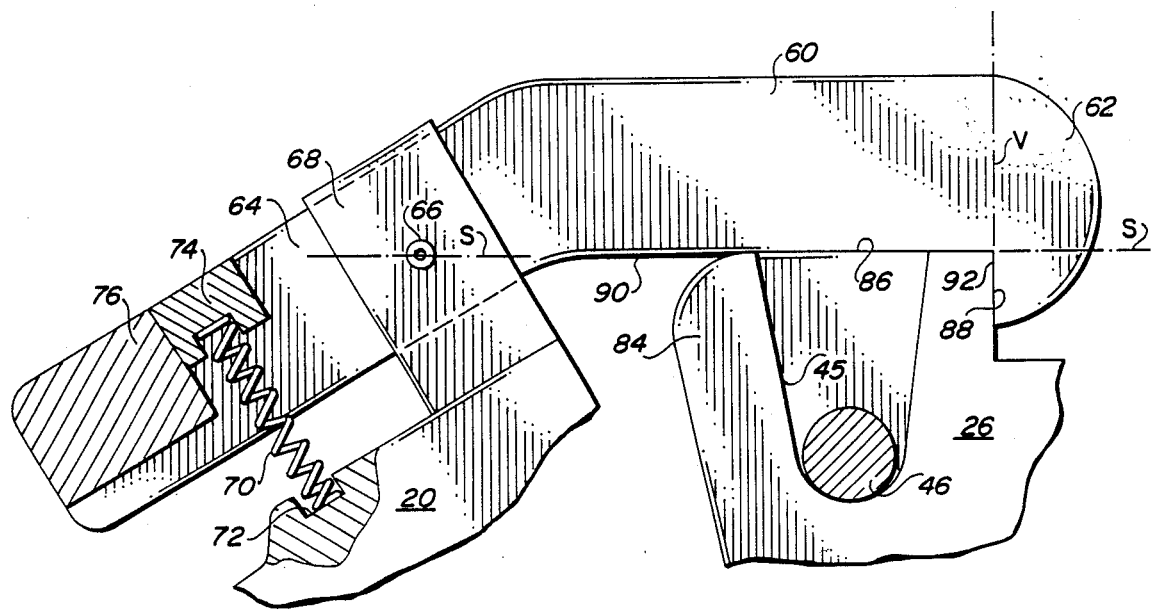
FIG. 4 is an enlarged transverse sectional view of the latch mechanism of the invention, showing the latch in closed position.
Figure 5:
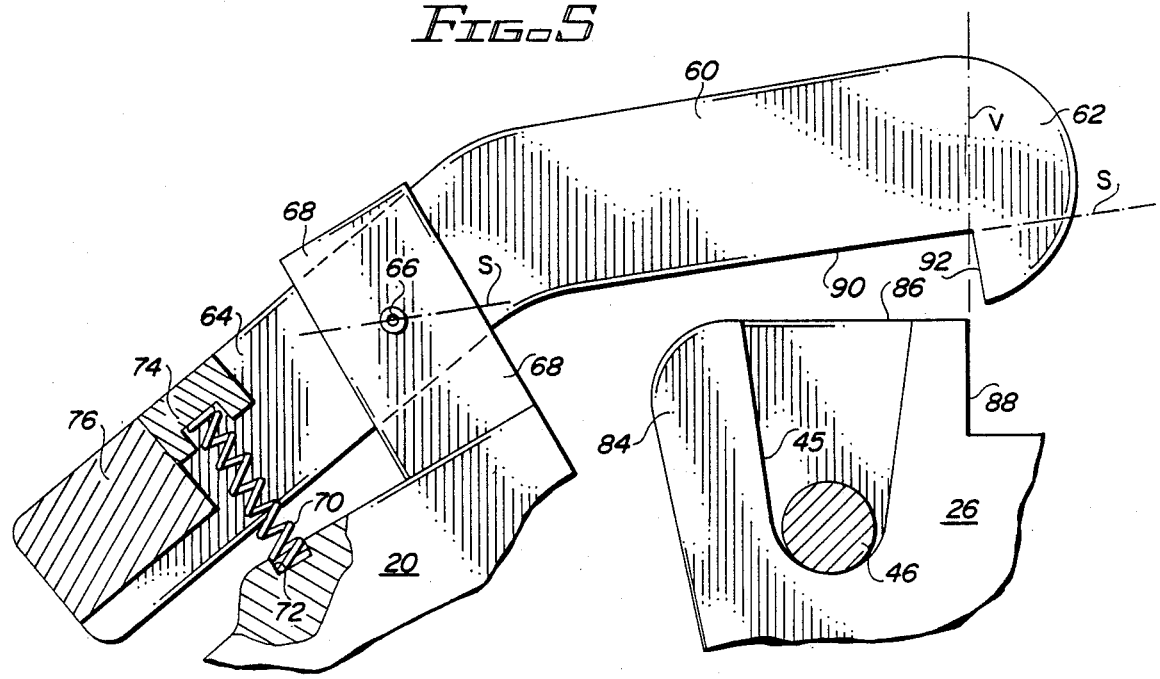
FIG. 5 is a view similar to that of FIG. 4, but showing the latch in open position.

As best shown in FIGS. 3, 4 and 5, each of the front side plates 26 has a lug portion 84 extending upwardly in the area of the guide rod slot 45. The lug includes a substantially horizontal planar latch arm support surface 86 and a substantially vertical planar latch seat surface 88. The latch arm 60 includes a latch stop surface 90, adapted to rest on the latch arm support surface 86 when the latch mechanism is in locked position, and a substantially planar latching surface 92 extending substantially at right angles to the latch stop surface 90. The latch stop surface 90 of the latch arm lies in a plane S that passes through the pivot 66, whereby the latch arm support surface 86 also lies in the same plane when the latch arm is in locking engagement with the latch seat. The latch seat surface 88 lies in a vertical plane V extending at right angles to the plane H. Thus when the latching mechanism is in latched condition both the latch seat surface 88 and the latching surface 92 lie in the same plane V.

In operation, in the event the operator has to unlock the latch mechanism it is merely necessary to push down on the release bar 76 with a medium amount of force sufficient to overcome the force of the spring 70 and the vertical friction forces between the latching arm surface 92 and the latch seat surface 88. This action will cause the latch arm to pivot up about the pivot 66. As shown more clearly in the diagrammatic representation in FIG. 6, when such pressure is exerted the outermost extremity Y of the latching surface 92 describes an arcuate path A which is spaced from the latching seat 88. This occurs because the radius R1 of the point Y, or the distance from point Y to the pivot point 66, is greater than the radius R2 of the innermost point Z on the latching arm surface 92, which is at the intersection of the latching surface 92 and the latch stop surface 90. Because the arcuate path A leads away from the latch seat 88 the frictional forces between the latching surface 92 and the latch seat surface 88 are minimized and the need in the prior art arrangement to exert an additional tensioning force in the direction of the nip of the pull rolls is eliminated. This phenomenon is of course not limited to the effect on the outermost point Y on the latching arm surface 92 but would likewise apply, to a slightly lesser degree, to every point on the latching surface 92 located outwardly of the point Z.

It can thus be seen that when the innermost point Z on the latching arm surface is located a shorter distance from the pivot point of the latch arm than the rest of the latching arm surface, the result just described is achieved. In theory, therefore, this would apply to any arrangement wherein the pivot point is located at or above a plane passing through the latch arm support surface 86 and the innermost point Z on the latching arm surface. In practice, however, the farther above the plane of the latch arm support surface 86 that the pivot point 66 is located, the less latching pressure is exerted on the latch seat 88 when the latch arm is in locked condition. Therefore, in practice it is preferred to locate the pivot point on or only slightly above the plane passing through the seat surface 86 and the innermost point Z on the latching arm surface 92.

It is of course necessary to provide enough room for the handle portion or lever portion of the latch arm to move downwardly a sufficient distance during the latch arm release operation to allow the latch arm to fully disengage from the latch seat.

It should now be appreciated that the invention overcomes a major problem previously encountered in moving the idler roll out of contact with the drive roll and also improves the safety of the operation. In addition, the design of the latch mechanism requires only minor redesign of the pull roll housing in order to accommodate it.

It should now be understood that the invention is not necessarily limited to all the specific details described in connection with the preferred embodiment but may be modified by those skilled in the art in ways which do not affect the overall basic function and concept of the invention without departing from the spirit and scope of the invention, as defined in the appended claims.

What is claimed is:

1. In mineral fiber attenuation apparatus having a pair of coacting pull rolls for pulling filament primaries from a bushing, wherein one of the pull rolls is mounted on first support means and the other pull roll is mounted on second support means, and wherein said first and second support means are movable toward and away from each other to enable said pull rolls to be moved into and out of operative engagement with each other, and including a latch mechanism for holding the roll support means in a position whereby the pull rolls are operatively engaged, said latch mechanism comprising:

a latch arm pivotally attached intermediate the length thereof to one of said support means;

the latch arm on one side of the pivotal attachment including a projecting latching surface;

the other of said roll support means defining a mating surface forming a latch seat;

spring means biasing the latching surface of the latch arm into locking engagement with the latch seat;

handle means on the opposite side of the pivotal attachment for manually pressing in opposition to the spring means bias to cause the latching surface of the latch arm to slidably disengage from the latch seat and release the support means for movement of the pull rolls out of engagement with each other; and wherein said latching surface and said mating surface of said latch seat are generally planar surfaces, and pivotal disengagement of said latch arm causes said surfaces to move relative to each other in a direction having a component separating said surfaces.

2. The latch mechanism of claim 1, wherein both the planar latching surface of the latch arm and the mating surface of the latch seat in the latched position are in a plane extending generally transversely of another plane extending through the axes of rotation of the pull rolls.

3. The latch mechanism of claim 2, wherein the transversely extending planes are substantially perpendicular to each other.

4. The latch mechanism of claim 2, wherein the latch arm includes a latch stop surface extending transversely of and intersecting the latching surface and wherein the latching surface terminates in a latching surface extremity, the latching surface extremity being at a greater radius from the pivotal attachment of the latch arm when in latched condition than the radius from said pivot to the intersection between the latching surface and the latch stop surface, whereby unlatching pivotal movement moves the latching surface relatively outwardly from the latch seat.

5. The latch mechanism of claim 4, wherein the latching surface intersects the latch stop surface of the latch arm at substantially a right angle.

6. The latch mechanism of claim 5, wherein the latch seat extends transversely of and intersects a latch arm support surface, the latch stop surface of the latch arm engaging the latch arm support surface when the latch arm is in latched position.

7. The latch mechanism of claim 6, wherein the latch stop surface of the latch arm and the pivotal attachment of the latch arm lie substantially in a common plane.

8. The latch mechanism of claim 7, wherein there are two sets of similar latch arms and latch seats, each set being located at opposite ends of the pull rolls, and a release bar connecting the latch arms on the side of the latch arms opposite the latching surfaces thereof.

9. The latch mechanism of claim 8, wherein said other roll support means is fixed against movement and said one roll support means is mounted for pivotal movement toward and away from said other roll support means.

* * * * *